(12) United States Patent
Temerinac et al.

(10) Patent No.: US 6,215,830 B1
(45) Date of Patent: Apr. 10, 2001

(54) CARRIER CONTROL LOOP FOR A RECEIVER OF DIGITALLY TRANSMITTED SIGNALS

(75) Inventors: Miodrag Temerinac, Gundelfingen; Franz-Otto Witte, Emmendingen, both of (DE)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 09/126,889

(22) Filed: Jul. 13, 1998

(30) Foreign Application Priority Data

Jul. 31, 1997 (EP) .............................. 97 11 3212

(51) Int. Cl.[7] .......................... H04L 27/14; H04L 27/06; H04L 23/02; H04L 12/56
(52) U.S. Cl. .......................... 375/326; 375/261; 375/344; 329/328; 370/410
(58) Field of Search .................................... 375/340, 261, 375/326, 344; 329/308; 370/410

(56) References Cited

U.S. PATENT DOCUMENTS

| | | | |
|---|---|---|---|
| 4,827,515 | * | 5/1989 | Reich ........................... 381/7 |
| 5,093,847 | * | 3/1992 | Cheng ......................... 375/344 |
| 5,872,812 | * | 2/1999 | Saito et al. ................... 375/261 |
| 5,974,098 | * | 10/1999 | Tsuda ......................... 375/340 |
| 6,041,085 | * | 3/2000 | Anzai ......................... 375/326 |

FOREIGN PATENT DOCUMENTS

| | | |
|---|---|---|
| 0281652 | 9/1988 | (EP) . |
| 0381636 | 1/1990 | (EP) . |
| 0692896 | 1/1996 | (EP) . |
| 0769364 | 4/1997 | (EP) . |

* cited by examiner

Primary Examiner—Stephen Chin
Assistant Examiner—Tony Al-Beshrawi
(74) Attorney, Agent, or Firm—Arthur L. Plevy; Buchanan Ingersoll PC

(57) ABSTRACT

A carrier control loop (1) for a receiver of digitally transmitted signals is disclosed comprising, in the direction of signal flow, a quadrature demodulator (3), a symbol recognition device (4), a detector (9) for forming a phase deviation value ($\phi d$) and/or a frequency deviation value (fd), a feedback device (10), and a variable-frequency oscillator (11) connected to the quadrature demodulator (3). An evaluating device (12) determines from signals (I, Q) of the carrier control loop (1) a reliability value (z) for the measured phase deviation value ($\phi d$) and/or frequency deviation value (fd), and controls the carrier control loop (1) in accordance with the determined reliability value.

20 Claims, 7 Drawing Sheets

$\varphi m = \varphi = \arctan(Q/I)$ $\varphi m = \varphi - \pi/2$
$= \arctan(|I|/Q)$ $\varphi m = \varphi +/- \pi$
$= \arctan(|Q|/|I|)$ $\varphi m = \varphi + \pi/2$
$= \arctan(I/|Q|)$ S/N = 9dB S/N = 6dB S/N = 3dB

CARRIER CONTROL LOOP FOR A RECEIVER OF DIGITALLY TRANSMITTED SIGNALS

FIELD OF INVENTION

This invention relates to a carrier control loop for a receiver of digitally transmitted signals which are transmitted as symbols using quadrature modulation.

BACKGROUND OF INVENTION

Examples of such transmission methods are also known by the following abbreviations: FSK (Frequency Shift Keying), PSK (Phase Shift Keying), BPSK (Binary Phase Shift Keying), QPSK (Quaternary Phase Shift Keying), and QAM (Quadrature Amplitude Modulation). The receiver circuits for these methods are known and are generally similar in design. An important constituent is an analog or digital carrier control loop which ensures that a quadrature demodulator operates with the correct phase and frequency. The quadrature demodulator serves to demodulate the quadrature-modulated signal, so that the individual symbols from which the desired data stream can ultimately be reconstructed can be determined via the separated quadrature signal components by means of a symbol recognition device. This requires that the quadrature demodulator in the carrier control loop be operated with the exact phase and frequency so that the two quadrature signal components can be reliably separated.

For receivers of digitally transmitted signals, all-digital circuit technologies are increasingly being used, whose fundamental advantages in terms of stability, reproducibility, immunity to interference, etc. are known. Analog stages are used only where the signal frequencies are too high for digitization. Where the respective interface for the digitization is located depends on a trade-off between the required characteristics and the associated circuit complexity, an important quantity being the necessary digitization frequency, which is generally determined by the system clock used in the receiver, and which is limited by the respective circuit technology employed. For the circuit implementation it is advantageous if the digitization takes place before the carrier control loop, e.g., in the tuner or intermediate-frequency stage, because then the signal processing of the entire carrier control loop is an all-digital one.

The digital quadrature demodulation of the digitized input signal uses a pair of digital conversion signals whose digital value curves are sine- and cosine-shaped. The individual sine and cosine values are formed by a digital oscillator using an overflowing accumulator and a sine and cosine table. The overflow frequency of the digital oscillator is identical with the frequency of the conversion signal pair. The greater the ratio of the system clock frequency to the conversion frequency, the better the frequency accuracy of the overflowing accumulator will be, the resolution being determined essentially by the number of bits of the numerical value to be accumulated and the corresponding number of bits of the accumulator.

To ensure that the mixing process for the demodulation in the quadrature demodulator takes place with the correct phase and frequency, the phase and frequency of the frequency-variable oscillator are controlled by means of a feedback device. To accomplish this, an error detector determines from the outputs of the quadrature demodulator and the subsequent stages phase and frequency deviation values which indicate how far the phase and frequency of the conversion signal pair deviate from the respective desired values. Finally, a control signal for the variable-frequency oscillator is formed. Without this phase-locked control, subsequent assignment of a symbol to a predetermined phase location or phase range would not be possible. As the signals are band-limited and interference or noise signals are superimposed on them, the original punctiform phase location blurs into an areal phase and amplitude range, with the phase limits overlapping one another under unfavorable conditions.

The known advantages of this digital coding are that the original data stream can be easily decoded at the receiver end, with the digital coding being relatively insensitive to interference on the transmission path or in the receiver. Starting from this known prior art, it is an object of the invention to make the receiver end even less sensitive to interference.

SUMMARY OF INVENTION

Figure 1:
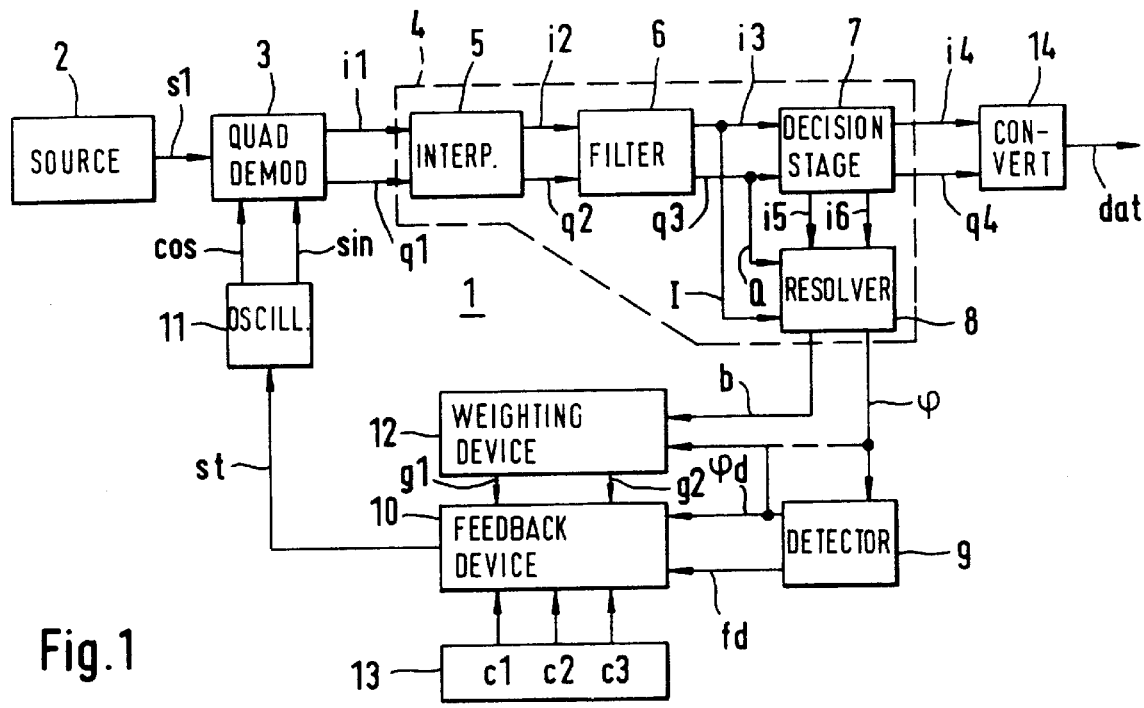
FIG. 1 is a block diagram of a receiver for digitally transmitted signals.

A carrier control loop for a receiver of digitally transmitted signals, including in the direction of signal flow, a quadrature demodulator, a symbol recognition device, a detector for forming a phase deviation value ($\phi d$) or a frequency deviation value (fd), a feedback device, and a variable-frequency oscillator connected to the quadrature demodulator, wherein an evaluating device determines from signals of the carrier control loop a reliability value (z) for the respective phase deviation value ($\phi d$) or frequency deviation value (fd) measured in the detector, and controls the carrier control loop in accordance with the determined reliability value (z).

DETAILED DESCRIPTION OF THE INVENTION

This object is attained by coupling the carrier control loop to an evaluating device which determines a reliability value for the respective phase deviation value and/or frequency deviation value measured in the detector from signals of the carrier control loop, particularly from signals of the symbol recognition device, and controls the carrier control loop in accordance with the determined reliability value.

The invention is predicated on recognition that in the case of severely disturbed signals, it is not only the symbol recognition uncertainty which plays an essential role, but a substantial contribution to incorrect recognition is conditioned by the control action in the carrier control loop itself. In the case of severely disturbed signals, the control responds much too sensitively or even incorrectly to noisy phase and/or frequency deviation values, and attempts to constantly readjust the phase. As a result, the phase reference for the evaluation becomes very unreliable and the correct recognition of the respective symbol is significantly impaired. Through the introduction of a reliability value, the carrier control loop can be adaptively controlled in accordance with the measured noise or interference level. To accomplish this, at small reliability values, the carrier control loop becomes less sensitive overall or to relatively high-frequency spurious components, or adapts its control time constant. Individual processing of the respective deviation values is particularly effective: at low reliability values, the associated phase or frequency deviation values contribute little to the control or are even blocked, but at sufficient reliability values, they make a normal or high contribution to the control. This weighting or blocking has the advantage that single or burstlike disturbances, in particular, will not disturb the current phase condition, with neither the control slope nor the control rate having to be changed. Thus, the carrier control loop still can easily track rapid changes provided that the signals are reliably recognized.

To determine the reliability values, characteristic signal changes caused by interference are evaluated. As mentioned above, the defined location for the symbol widens in both the phase and amplitude directions with increasing interference. If noise with a Gaussian distribution which is superposed on the two quadrature signal components in an uncorrelated manner is assumed as an interference model, it is possible to calculate the probability that the symbol will be recognized as correct or wrong. The measured phase and amplitude deviation values can also be interpreted and evaluated in accordance with the mathematically determinable probability distribution such that they represent a measure of reliability. The smaller the deviation values, the greater the reliability and the lower the uncertainty that the evaluation will supply a wrong symbol. For the inventive influence on the carrier control loop it is insignificant whether the association between the measurable deviation values and the calculable reliability value is exact; this also depends on the respective interference model, which can only be regarded as an approximation to real conditions. It therefore suffices for an improvement to determine the reliability value relatively coarsely, for example by setting thresholds for the measured deviation values.

It is also possible, of course, to form the reliability values with much more complex circuitry or in another manner, for example by evaluating noise-induced variations in the demodulated signal and the still undemodulated signal. By means of filter circuits, the determination can be limited to frequency ranges which are largely independent of the modulation.

Another aspect in the evaluation of the reliability is the respective effect of the deviation value on the control loop. Should the deviation value cause the control loop to change its state or remain in the current state? By weighting the probability value, the current state or the changed state, for example, can be emphasized. This weighting can be accomplished, for example, by multiplying the probability value by a pulling-force value which is determined by the distance of the measured phase from the respective desired symbol value.

It is particularly advantageous if the determination of the deviation can be performed separately with respect to phase and amplitude. To do this, a resolver transforms the Cartesian coordinates of the quadrature signal components into polar coordinates. For digital systems, the iterative resolvers according to the CORDIC technique are particularly suitable. The reliability values can be evaluated via suitable characteristics or families of characteristics which assign to the individual deviation values new values that are used for the control. The characteristics or families of characteristics may be stored in tables. In the simplest case, they will be constituted by a bent characteristic, a one- or two-sided limitation, or a one- or two-sided signal suppression. Such characteristics can be easily implemented with threshold detectors, which may also be designed as window comparators, particularly if only blocking devices have to be controlled.

For the carrier control loop, the feedback device represents the loop filter which converts the measured phase and frequency deviation values into a control signal for the oscillator. Good control action can be achieved with a PID (proportional-integral-derivative) controller structure which uses the phase deviation value and the frequency deviation value as input signals. By means of gating or blocking devices controlled by the reliability value, the processing of these signals can be interrupted. It is even possible to smooth the deviation values or free them from signal excursions prior to the processing in the feedback device using separate filter circuits. Especially suited for this purpose are MTA (moving-time-averager) filters, since an interruption of the clock signal has the same effect on the respective deviation value as an inhibiting gate. MTA filters are especially suitable if at the same time a data rate reduction is desired.

For the coordinate transformation, use is advantageously made of a modified CORDIC technique in which the quadrature signal components are mirrored into the first quadrant for evaluation. This is accomplished by appropriate inversion of the signs and/or interchange of the quadrature signal components. If the symbols are defined not only by different phases, but also by different amplitudes, the determination of the reliability values may require an amplitude normalization ahead of the resolver which involves a complex multiplication of the current quadrature signal components by the desired values of the associated symbol. By subtracting a phase correction value dependent on the modulation from the mirrored phase value, the associated phase deviation value is formed. For QPSK modulation, for example, the phase correction value is $\pi/4$. From at least two phase values following each other in time, a frequency deviation value is formed by modulo subtraction. The modulo subtraction is performed in the two's complement number system by neglecting the overflow and sign bits.

The invention and a preferred embodiment thereof will now be explained in more detail with reference to the accompanying drawings.

The block diagram of FIG. 1 shows essentially the functional units of a carrier control loop 1 for a receiver of digitally transmitted signals. The input is represented by a digital signal source 2, e.g., a tuner, a converter, or a cable receiving station. It includes an analog-to-digital converter which digitizes the applied signal by means of a system clock and feeds this digitized signal sl to a quadrature demodulator 3. The outputs of the latter are an in-phase component i1 and a quadrature component q1. The quadrature signal components i1, q1 are fed to a symbol recognition device 4 which contains conventional circuits in the form of a sampling interpolator 5, a Nyquist receiver filter 6, a symbol decision stage 7, and, as a rule, a resolver 8, which is fed by an in-phase component I and a quadrature component Q from the symbol recognition device 4. The resolver 8 may be preceded by a normalizing stage which, as mentioned, performs a complex multiplication.

The carrier control loop 1 further includes a detector 9 for forming a phase deviation value φd and a frequency deviation value fd. At the input end, the detector 9 is supplied with a phase value φ from the resolver 8. The detector 9 is followed by a feedback device 10 which is fed by the phase and frequency deviation values from the detector 9 and which provides a control signal st for a variable-frequency oscillator 11. The latter generates a pair of conversion signals cos, sin, which are applied to the quadrature demodulator 3. The carrier control loop 1 is thus complete.

The carrier control loop 1 described so far corresponds to conventional circuits. The improved operation of the carrier control loop 1 according to the invention is achieved through an evaluating weighting device 12 which, in the embodiment of FIG. 1, is coupled at the input end to the resolver 8, determines reliability values from the output signals of the resolver, and uses these reliability values to control the feedback device 10. The evaluating device 12 generates a phase deviation value φd in a similar manner as the detector 9, or is supplied with this value. The amplitude value and/or the absolute value b of the resolver 8, which is mirrored into the first quadrant, is transferred directly into the evaluating device 12. The phase deviation value φd can thus be evaluated in a simple manner via two symmetrical threshold values φ1, φ2 (see FIG. 12). At the absolute value b, the threshold values b1, b2 are unsymmetrical with respect to the desired amplitude with the value 1 (see FIG. 12). The greater threshold value b2 even can be chosen to be so great as to be rarely exceeded by the absolute value b it therefore can be dispensed with. The evaluation via the threshold values yields a first gating signal g1 and a second gating signal g2 which control blocking devices 30, 31, gates, within the feedback device 10. A coefficient memory 13 supplies the PID feedback device 10 with filter coefficients c1, c2, c3.

In the block diagram of FIG. 1, the symbol recognition device 4 is followed by a converter 14 which converts the recognized symbols back into a serial data stream dat. The sampling interpolator 5 determines the optimum instant at which the symbol value should be extracted from the quadrature signal components i1, q1. In the digital implementation, the sampling interpolator forms the correct sampling instant from the adjacent given values purely mathematically by interpolation. Its output signals are the quadrature signal components i2, q2, which are fed to the Nyquist receiver filter 6, which generally also performs a sampling-rate conversion from the system clock to the symbol frequency. In the case of QPSK modulation, the quadrature signal components i3, q3 after the Nyquist receiver filter 6 can be easily decoded in the symbol recognition device 4 via the signs of the components i3, q3. The quadrature signal components i4, q4 at the output of the symbol recognition device 4 contain only the most significant bits by which the individual symbols are defined. For the formation of the deviation values φd, fd in the detector 9 and of the associated reliability value in the evaluating device 12, the pairs of quadrature signals should contain as many of the available bits as possible, for which reason the quadrature signal components i3, q3, which are also available with the lower symbol frequency, are used for evaluation. The following description, which deals essentially with the formation of the reliability value, uses only the more general reference characters I, Q for the quadrature signal components.

Figure 2:
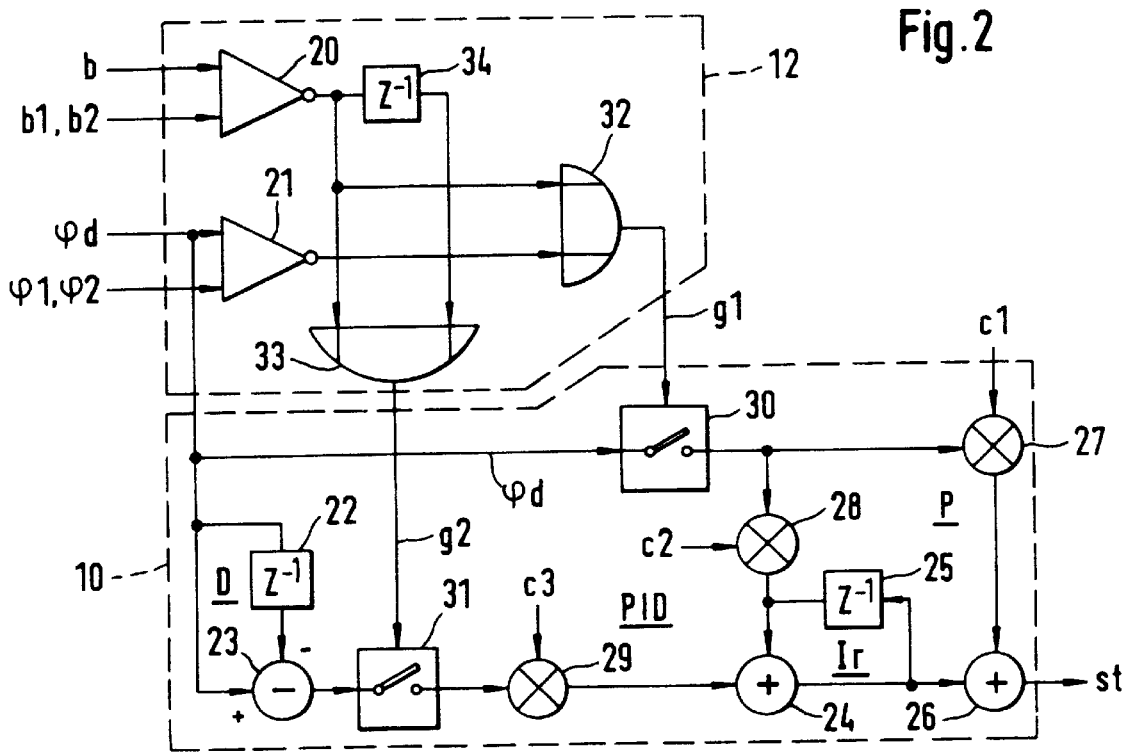
FIG. 2 is a schematic diagram of subcircuits of the carrier control loop.

FIG. 2 shows an embodiment of the feedback device 10 and the evaluating device 12 in a schematic block diagram. The feedback device 10 is designed as a PID controller which processes the phase deviation value φd in the proportional section P and integral section Ir and the frequency deviation value fd in the derivative section D. The evaluating device 12 contains in the input section a threshold detector 20 for the absolute value b and a threshold detector 21 for the phase value φ or the associated deviation value φd. The associated threshold values are the amplitude thresholds b1, b2 and the phase thresholds φ1, φ2, respectively. A threshold detector with two thresholds is also referred to as a window comparator. The assignment of the individual functional units in FIG. 2 to the evaluating device 12 or the feedback device 10 is insignificant for their interaction.

From the phase deviation value φd, a frequency deviation value fd is formed by means of a delay element 22 and a subtracter 23. If, for example, the frequency deviation value increases constantly, this means that the vector defined by the quadrature signal components I, Q rotates at a constant frequency. The difference at the output of the subtracter 23 then remains constant, and its value is an exact measure of the frequency deviation. If the variable-frequency oscillator 11 generates its pair of conversion signals cos, sin exactly with the frequency of the quadrature signal carrier, the resultant stops, so that the frequency deviation value fd will be constantly zero. Proper quadrature demodulation requires, however, that the resultant does not have a phase deviation value φd, either, because otherwise the reference phase would not be correct. Readjustment of the phase is performed in the feedback device 10, particularly by means of the integral section Ir, whereby prolonged phase deviations are corrected. The integral section Ir consists of an accumulator loop with an adder 24 and a delay element 25.

The control slope of the integral section Ir, as is well known, must not be steep, because otherwise hunting may occur. For relatively short-time phase deviation values φd, a steeper control slope is desirable, which is caused by the proportional section P of the PID controller, whose relatively great resetting or pulling force is proportional to the respective phase deviation value φd. The individual control components are combined by the adder 24 and an adder 26, and the sum value forms the control signal st for the variable-frequency oscillator 11. The contributions of the individual components of the PID controller can be changed by means of three multipliers 27, 28, 29, to which coefficients c1, c2, c3 are applied.

The signal paths of the phase deviation value φd and the frequency deviation value fd contain blocking devices 30 and 31, respectively, which are shown as switches and with which the respective signal paths can be blocked. The blocking is effected each time the evaluating device 12 determines that the reliability value is not sufficient for the respective deviation value φd, fd. If, for example, one of the two threshold detectors 20, 21 senses that the applied value lies outside the preset threshold values, a logic stage 32, for example an OR gate, will block the blocking stage 30. The phase deviation value fd is combined with at least two phase deviation values φd by the formation of the phase difference. If at least one of these phase deviation values φd is found to be unreliable, a logic stage 33 will block the blocking device 31 for the frequency deviation value fd. The reliability value for this is derived by means of the threshold detector 20 from the two temporally corresponding amplitude values. If one or both values lies or lie outside the predetermined threshold values b1, b2, the current frequency deviation value fd is not reliable and will be blocked by means of the blocking device 31. The logic stage 33 may also be implemented by an OR gate. Time compensation for the input signals of the gate 33 is provided by the delay stage 34.

It should be noted that the evaluating device 12 shown in FIG. 2 represents only one out of many variants. It is particularly simple, as it requires only two threshold detectors 20, 21, two simple logic stages 32, 33, and one delay stage 34 for controlling the two blocking devices 30, 31, but very effective, as it uses both the absolute value b and the phase value $\phi$ or the phase deviation value $\phi d$ to determine the reliability value; with a resolver 8 using the CORDIC technique, both the phase value and the absolute value b are available for this purpose. If the evaluating device 12 uses only one of the two values $\phi d$ for forming the reliability value, this also results in an improvement over conventional circuits, but easily attainable advantages are given away.

Figure 3:
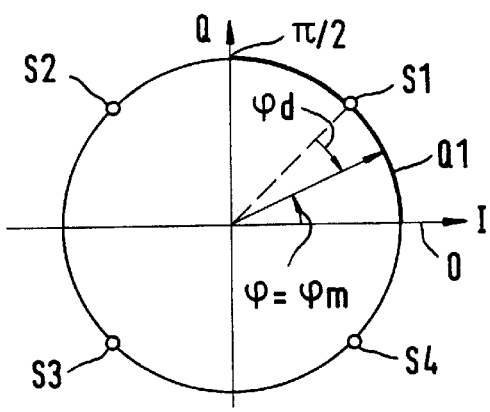
FIGS. 3 to 6 are vector diagrams illustrating the phase mirroring.
Figure 4:
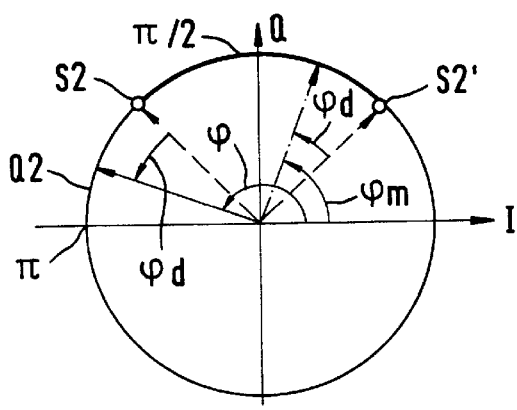
Figure 5:
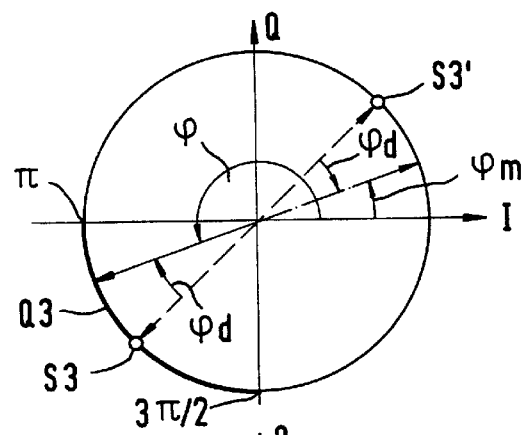
Figure 6:
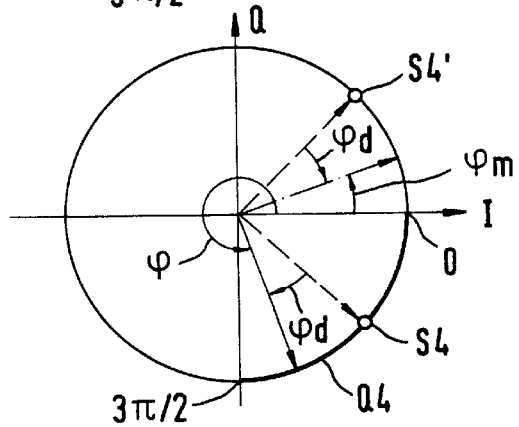

FIG. 3 shows, for the first quadrant Q1 in a vector diagram, the formation of the phase deviation value $\phi d$ as a function of the current phase value $\phi$, which is identical in the first quadrant with the mirrored phase value $\phi m$. FIGS. 4 to 6 are vector diagrams illustrating the mirroring of the three quadrants Q2 to Q4 into the first quadrant Q1. To simplify the representation of the mirroring or angle rotation, a QPSK modulation with the four symbols S1 to S4 is assumed. For a greater number of symbols, i.e., for a greater alphabet, the basic mirroring action does not change. The phase value $\phi$ to be mirrored, is defined by the two quadrature signal components I, Q. The mirroring of the phase value into the mirrored phase value $\phi m$ is accomplished by forming the absolute value and/or by appropriate interchange of the two quadrature signal components I, Q. By this method, the phase deviation value $\phi d$ assigned to the respective quadrant Q2, Q3, Q4 is mirrored into the first quadrant Q1 with exactly the same magnitude and the same sign if it lies within the limits of the associated symbol quadrant. The angular relationship between the mirrored phase value $\phi m$ and the mirrored symbol S2', S3', or S4' is preserved. To obtain the respective phase deviation value $\phi d$ from the mirrored phase value $\phi m$, the aforementioned phase correction value $\phi c$, which is dependent on the respective modulation and corresponds to the mirrored phase value $\phi m$ of the associated symbol, is subtracted from the mirrored phase value $\phi m$. In the illustrated example using QPSK modulation, the phase correction value $\phi c$ has the value $\phi c = \pi/4$ for the first symbol S1 and for the mirrored symbols S2', S3', S3'. The following shows the law for the formation of the mirrored phase value $\phi m$ for all four quadrants:

first quadrant Q1 from $\phi=0$ to $\pi/2$: $\phi m=\arctan(Q/I)$,
second quadrant Q2 from $\phi=\pi/2$ to $\pi$: $\phi m=\arctan(|I|/Q)$,
third quadrant Q3 from $\phi=\pi$ to $3\pi/2$: $\phi m=\arctan(|Q|/|I|)$,
fourth quadrant Q4 from $\phi=3\pi/2$ to $0$: $\phi m=\arctan(I/|Q|)$.

Figure 7:
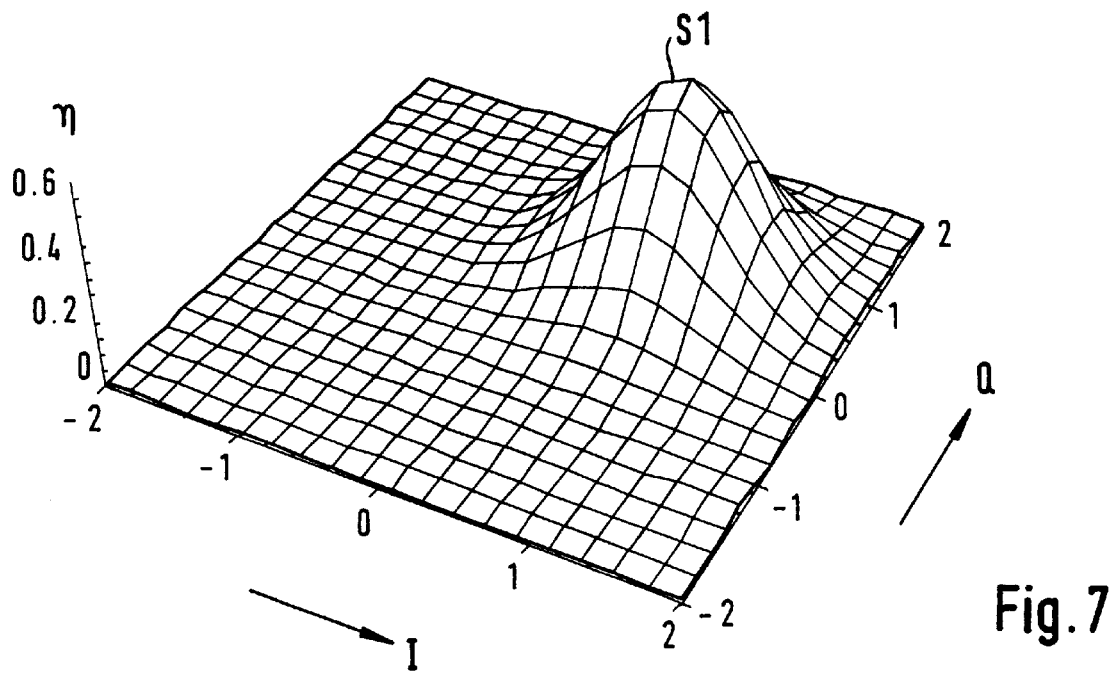
FIG. 7 shows a probability distribution in a I-Q diagram.

FIG. 7 shows the probability distribution $\eta$ of the quadrature signal components I, Q on the Cartesian I-Q plane if uncorrelated noise is superimposed on them, the noise having a Gaussian distribution. Because of the quadrature relationship between the I and Q components, actually the resultant vector length would always have to have the value 1 if the vector length is normalized. FIG. 7 shows the case where the first symbol S1, which lies in the first quadrant at a phase value of 45 degrees, is to be represented by the quadrature signal components I, Q. Without interference, the probability $\eta$ for the two components I, Q would have to have the value $\eta=1$ at the coordinates I=0.701 and Q=0.701 of the symbol S1, and the value zero everywhere else. FIG. 7 shows that instead, a Gaussian distribution of the I and Q components is present whose maximum lies at the symbol S1. If the signal-to-noise ratio S/N increases, the probability distribution at the symbol S1 becomes higher and narrower, and if the signal-to-noise ratio decreases, the maximum of the probability distribution at the symbol S1 decreases and the bell-shaped curve becomes correspondingly wide.

Figure 8:
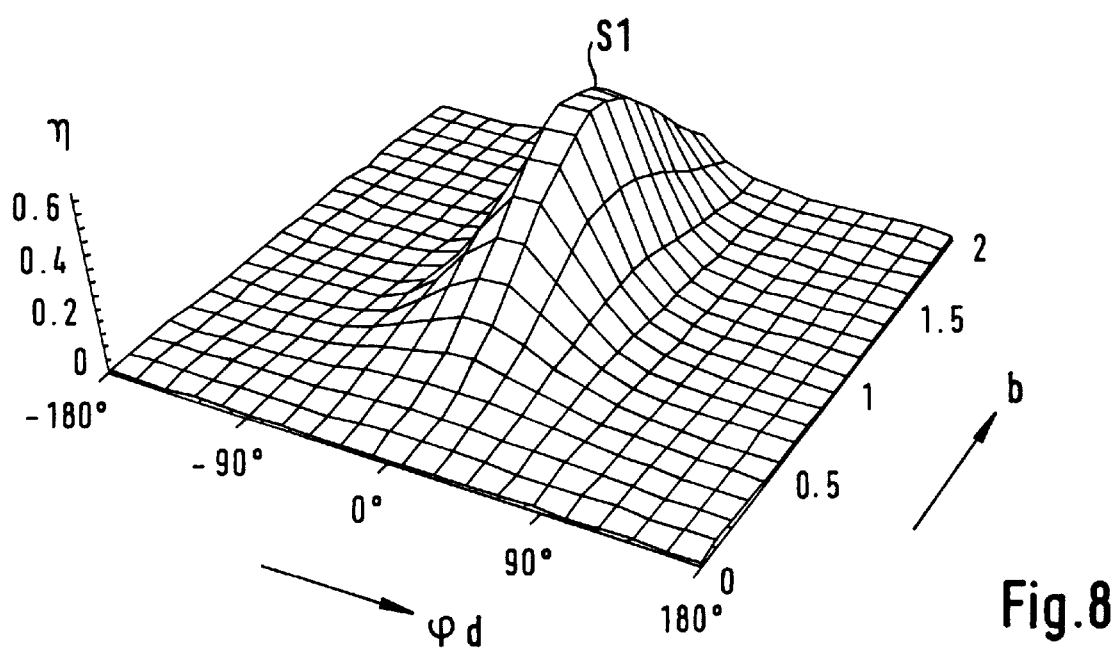
FIG. 8 shows a probability distribution in a phase-magnitude diagram.

FIG. 8 shows a probability distribution corresponding to FIG. 7 as it would present itself on a Cartesian plane defined by the phase deviation value $\phi d$ and the absolute value b. The bell-shaped curve formed from the probability distribution is no longer rotationally symmetric as in FIG. 7. This, however, is only a question of the scale of the absolute value b and the phase deviation value $\phi d$, which is shown from −180 degrees to +180 degrees.

Figure 9:
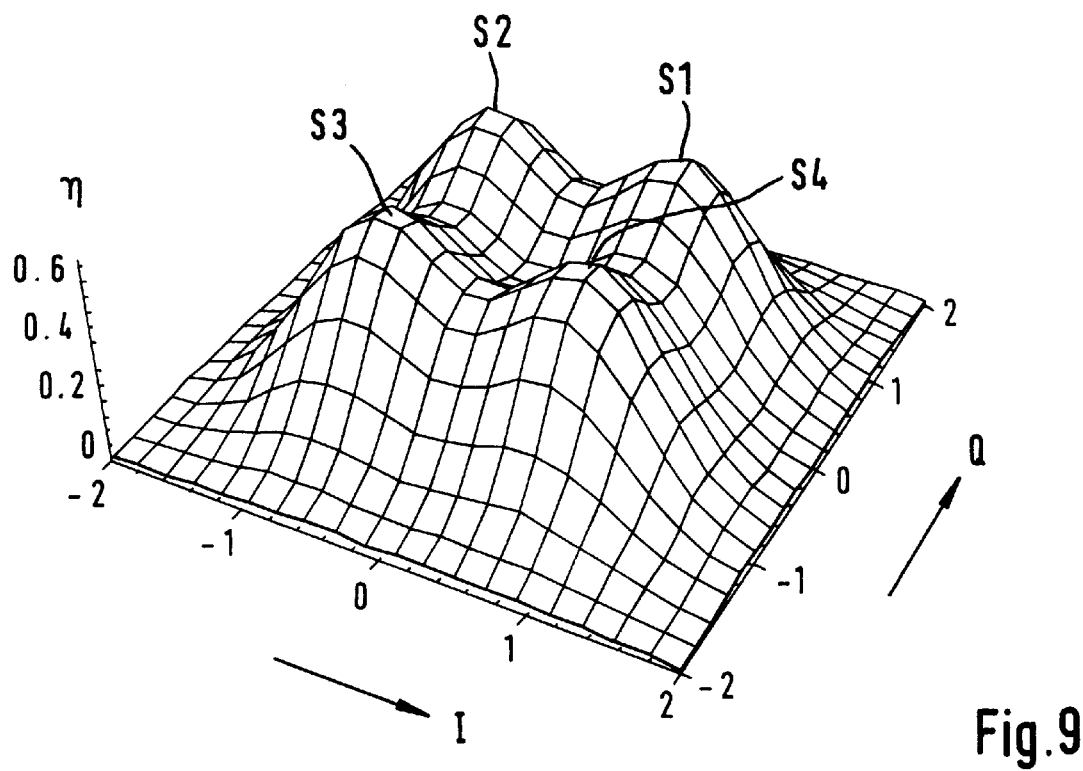
FIG. 9 shows an I-Q probability distribution for a QPSK modulation.
Figure 10:
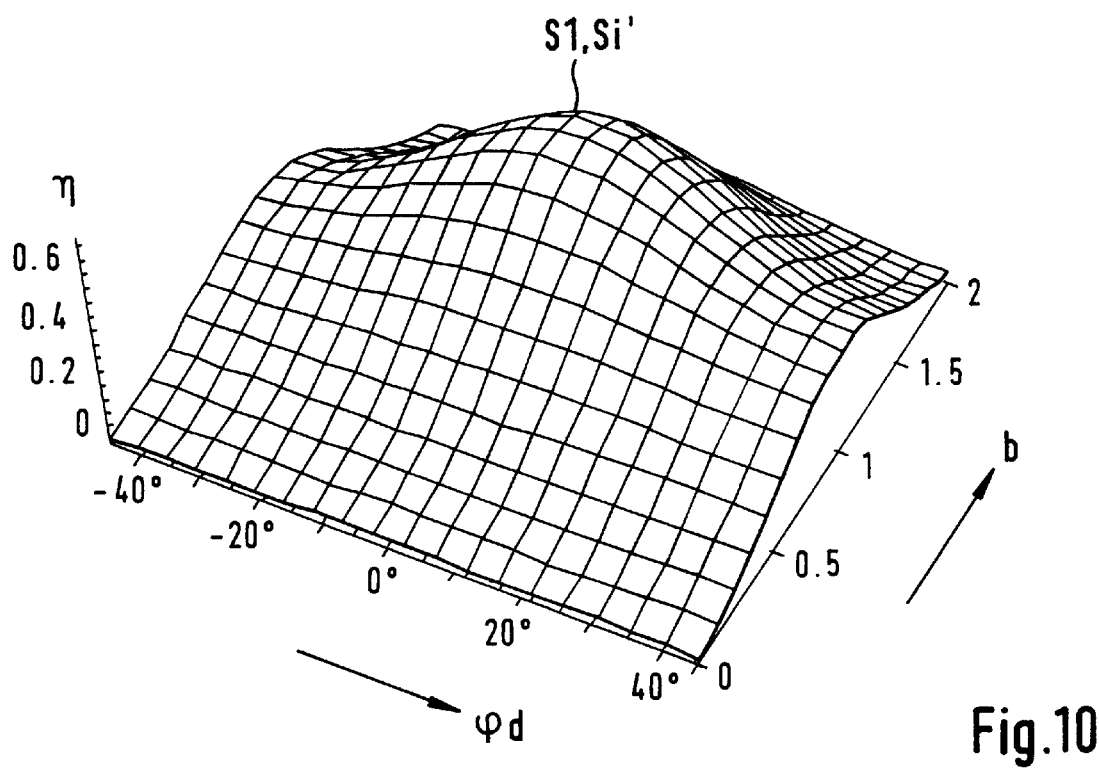
FIG. 10 shows the associated phase-magnitude diagram for the first quadrant.

FIG. 9 shows, in a manner similar to FIG. 7, the probability distribution $\eta$ on the I-Q plane for a QPSK modulation with the four equally probable symbols S1, S2, S3, S4. The four symbol values lie in the four quadrants which are determined by the signs of the quadrature signal components I, Q. Reliable separation of the four symbols by specifying the respective quadrants is no longer possible, since for the quadrant limits I=0 and Q=0 the probability value $\eta$ for the presence of one of the neighboring symbols is much too large. This is also apparent from FIG. 10, which corresponds to the first quadrant and which contains, besides the first symbol value S1, all mirrored symbol values Si' from the other quadrants. In the spatial representation of FIG. 10, the probability distribution $\eta$ is shown over Cartesian coordinates representing the phase deviation value $\phi d$ and the absolute value b. FIG. 10 corresponds to FIG. 8 except for the spread phase deviation scale, only that all four symbols can now occur with the same probability $\eta$.

Figure 11:
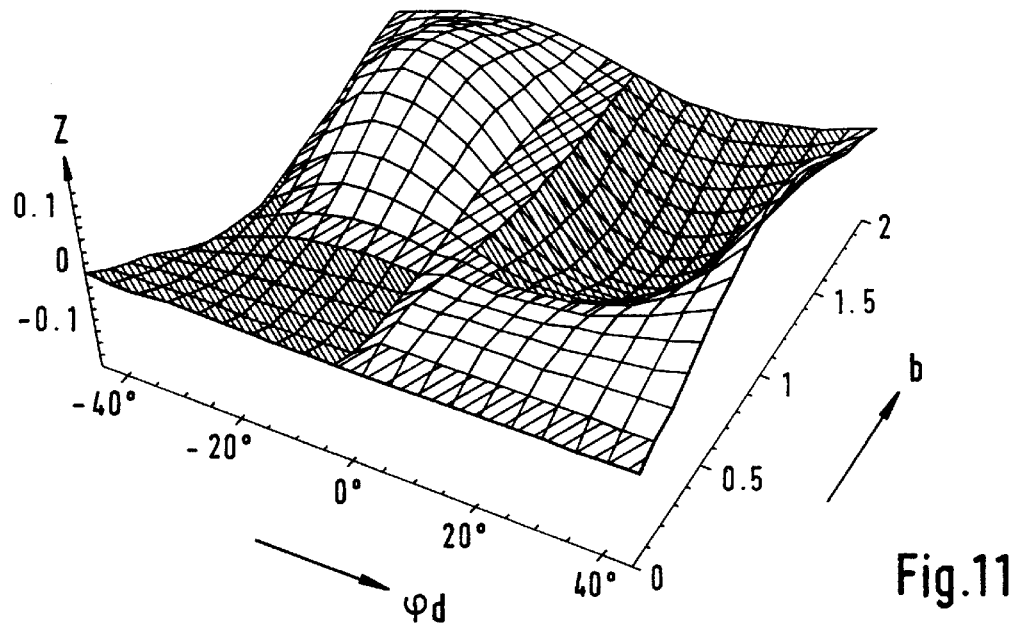
FIG. 11 shows a probability distribution weighted with the pulling force.

The use of the probability distribution $\eta$ for determining the reliability results in the deviation values used being limited to those which are assigned to the highest probability ranges of FIG. 10. Clearer information about the reliability of the measured phase deviation values $\phi d$ is obtained if the respective probability values $\eta$ are combined with the respective pulling force or resetting force from the phase deviation value $\phi d$. The actual contribution of each of the four symbols S1 to S4 must be taken into account, not only the mirrored condition. This is done by multiplying the probability value $\eta$ assigned to the respective symbol, see FIG. 10, by the actual phase deviation value $\phi d$, and adding these four products. The result forms a usable reliability value z, which is shown in the diagram of FIG. 11 in a spatial representation over the Cartesian coordinates representing the phase deviation value $\phi d$ and the absolute value b. By weighting all four probabilities $\eta$ with the actual phase deviation value $\phi d$, a "normalization" is obtained for the reliability value z, which now can have positive and negative values. Positive reliability values z correspond to a positive pulling force, and negative reliability values z to a negative pulling force. In the reliability distribution z of FIG. 11, one can clearly distinguish those ranges whose pulling-force sign is analogous to the respective phase deviation value $\phi d$. Ranges with a correct association between the reliability value z and the pulling direction are shown bright in FIG. 11, ranges with a wrong pulling direction are shown dark, and ranges with a neutral pulling direction are shown in a grey tone. The determination of suitable reliability values z consists in the fact that only those phase deviation values $\phi d$ are to be used for the control of the carrier control loop which cause the correct control direction and thus correspond to the reliability ranges with the correct sign. Conversely, at least those ranges of the phase deviation value $\phi d$ must be excluded for the carrier control which cause a reversal of the loop; this is apparent from the reliability diagram of the FIG. 11.

Figure 12:
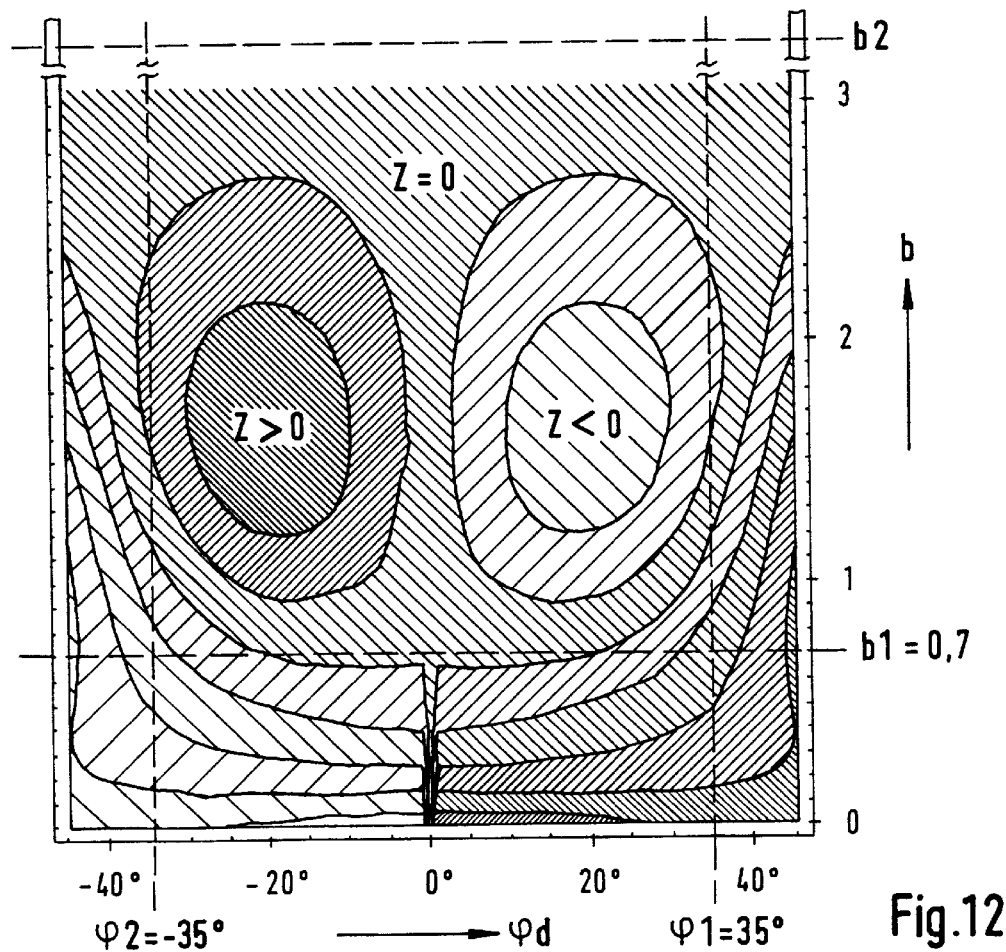
FIG. 12 shows a reliability diagram over d-b coordinates.

FIG. 12 shows a reliability diagram corresponding to FIG. 11 in a top view, in which the meanings of the grey levels have been interchanged from FIG. 11. The lines shown are lines of equal reliability z and correspond to the representation of contour lines. The diagram shows that for small absolute values b, the reliability decreases and no control should be performed with the measured phase deviation value $\phi d$. In FIG. 12, a threshold value b1 of 0.7 would largely cut off these unreliable ranges. Large absolute values b are uncritical, so that a second switching threshold b2 can be dispensed with or will be chosen high enough, for example $b2 \geq 3$. For the phase deviation value $\phi d$, the maximum for the reliability z lies not at the theoretical symbol values ±45 degrees, but well below these values, because the influence of the neighboring symbols is less there. This is also readily apparent from the diagram of FIG. 12. Possible limits for sufficient reliability are, for example, at the phase deviation values $\phi 1=+35$ degrees and $\phi 2=-35$ degrees.

Figure 13:
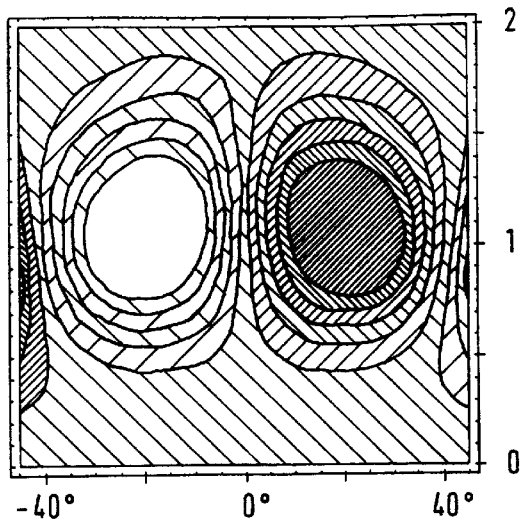
FIGS. 13 to 15 show reliability diagrams with different S/N values.
Figure 14:
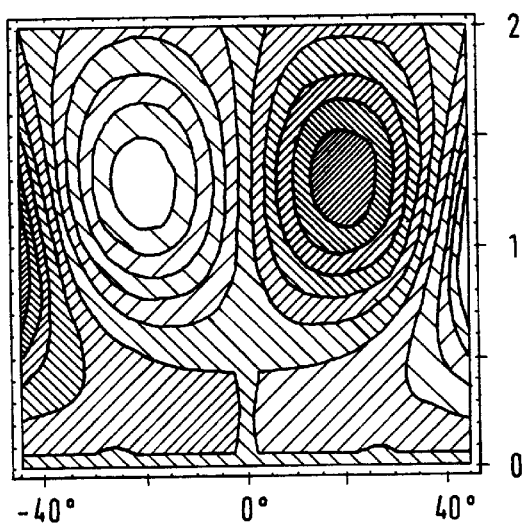
Figure 15:
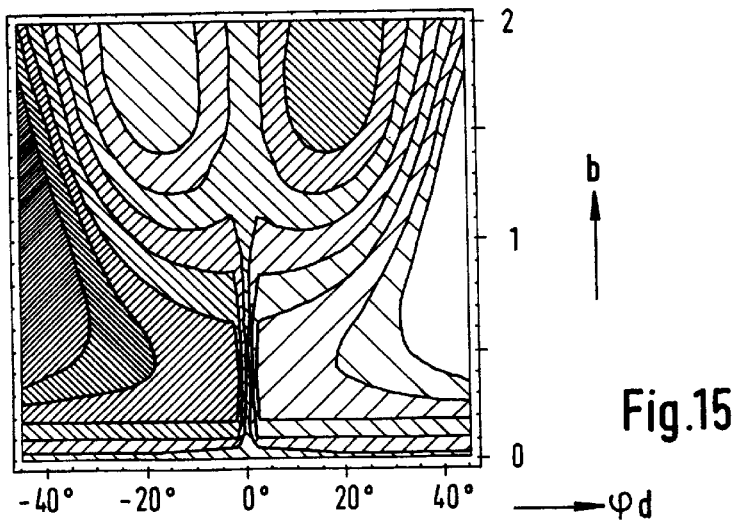

FIGS. 13 to 15 show top-view diagrams for the reliability value z at different signal-to-noise ratios S/N. FIG. 13 shows the diagram for S/N=9 dB, FIG. 14 the diagram for S/N=6 dB, and FIG. 15 the diagram for S/N=3 dB. The usable reliability ranges increase with increasing S/N ratio, of course. The maximum of the reliability value z, and thus the reliability of evaluation, increases correspondingly. For deteriorating S/N ratios, a distinct shift of the reliability maxima toward greater values b occurs. The diagram of FIG. 15, with S/N=3 dB, shows that the unreliable ranges are substantially greater than the reliable ranges. Here, satisfactory control by the carrier control loop is no longer possible. It should be noted that the grey levels of FIGS. 13 to 15 correspond to those of FIG. 11, but not to those of FIG. 12.

Figure 16:
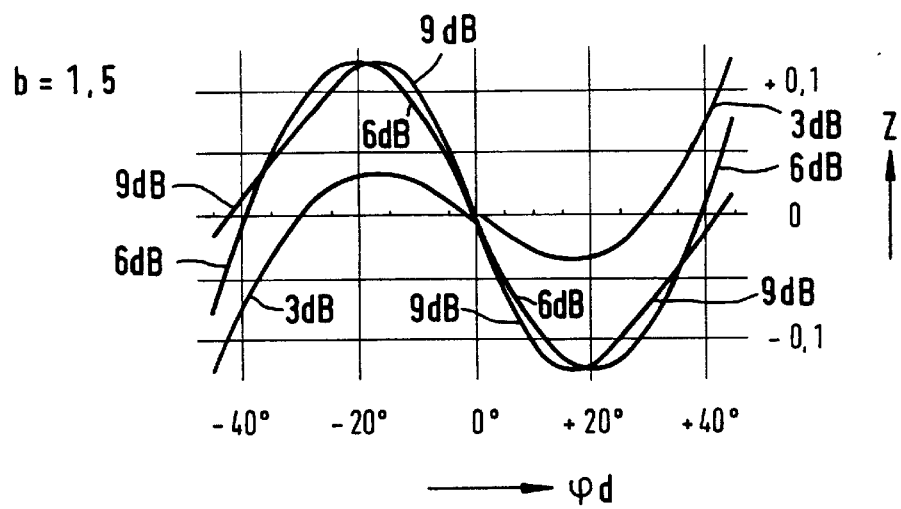
FIGS. 16 to 18 show critical ranges of the reliability determination.
Figure 17:
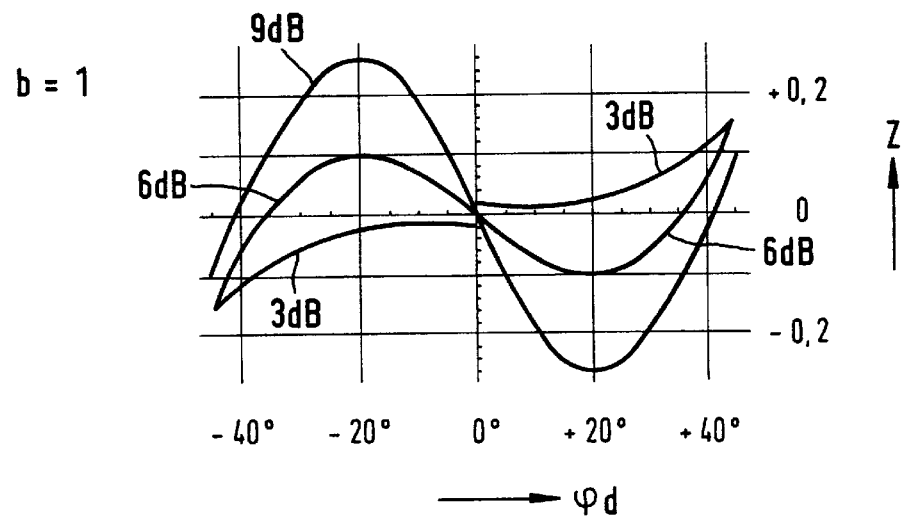
Figure 18:
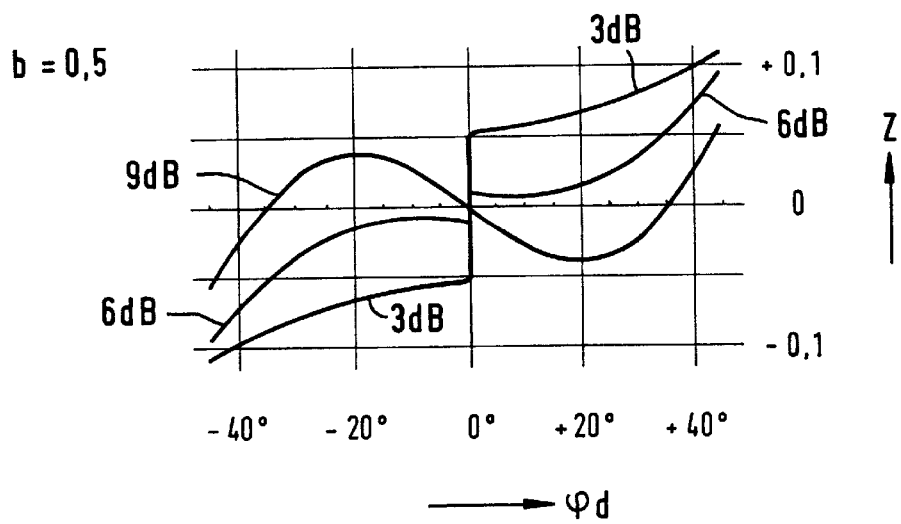

The determination of the reliability value z from the weighted superposition of the individual probabilities is apparent from FIGS. 16 to 18. In particular, discontinuities can be seen, which result from the multiplication of the probability value by the respective pulling force. The term "pulling force" as used herein means the phase deviation value up to the actual symbol, not only the phase deviation value in the first quadrant. In each of FIGS. 16, 17, and 18, the reliability values z are plotted against the phase deviation value $\phi d$ for three signal-to-noise ratios S/N, namely for S/N=9 dB, S/N=6 dB, and S/N=3 dB. FIG. 16 has the absolute value b=1.5 as a common parameter. The common parameter in the case of the curves of FIG. 17 is the absolute value b=1, and that in FIG. 18 is the absolute value b=0.5. The reliability characteristic z in FIG. 16 shows a small discontinuity at 0 degrees for the weak signal S/N=3 dB, with the absolute value b=1.5 serving as a parameter. At the smaller absolute value b=1, see FIG. 17, this discontinuity at 0 degrees has slightly increased. At the same time, the entire 3-dB curve lies in the unreliable range, which means that the reliability value z has the wrong sign there. For even smaller values b=0.5, see FIG. 18, the curves for S/N=3 dB and S/N=6 dB also run in the unreliable range, i.e., with the wrong sign. In addition, the reliability characteristic z for S/N=6 dB now also has a discontinuity at 0 degrees. The discontinuity of the S/N=3-dB curve has become even larger compared to FIG. 17. The discontinuities follow from the above-described model of weighted superposition for determining the reliability value z. If, in practice, one remains in the range of sufficiently great reliabilities, the model gives a good approximation to reality.

It should be noted that the improvement to the carrier control loop and the associated method can be easily adapted to the different circuit technologies. In particular, the loop is suitable for implementation as a monolithic integrated circuit which can be used in such receivers. Whether parts of the function or even the entire sequence of operations is implemented with a programmable processor is left to the discretion of those skilled in the art. Implementation with a processor, as is well known, has the advantage that the circuit becomes more flexible, as it can be adapted to the various tasks by means of programmable parameters. In addition, by means of a suitable program, intervention in the processing is possible even after integration.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

What is claimed is:

1. A carrier control loop for a receiver of digitally transmitted signals, comprising:

in the direction of signal flow, a quadrature demodulator, a symbol recognition device, a detector for forming a phase deviation value ($\phi d$) or a frequency deviation value (fd), a feedback device, and a variable-frequency oscillator connected to the quadrature demodulator, wherein an evaluating device determines from signals of the carrier control loop a reliability value (z) for the respective phase deviation value ($\phi d$) or frequency deviation value (fd) measured in the detector, and controls the carrier control loop in accordance with the determined reliability value (z).

2. The carrier control loop as claimed in claim 1, wherein the evaluating device evaluates a phase value ($\phi$) or an absolute value (b) which are formed by means of a resolver from an in-phase component (I) and a quadrature component (Q) produced by the quadrature demodulator.

3. The carrier control loop as claimed in claim 2, wherein the evaluating device comprises a first threshold detector for the phase value ($\phi$) or the phase deviation value ($\phi d$) or a second threshold detector for the absolute value (b) or an absolute deviation value.

4. The carrier control loop as claimed in claim 3, wherein a first blocking device is controlled in accordance with the output of the first threshold detector, and/or a second blocking device is controlled in accordance with the output of the second threshold detector.

5. The carrier control loop as claimed in claim 4, wherein by means of the first blocking device, the transfer of the phase deviation value ($\phi d$) into the feedback device is blocked, and that by means of the second blocking device, the transfer of the frequency deviation value (fd) into the feedback device is blocked.

6. The carrier control loop as claimed in claim 3, wherein the feedback device corresponds to a PID controller, with the phase deviation value ($\phi d$) being fed to a proportional section (B) and an integral section (Ir), and the frequency deviation value (fd) to a derivative section (D).

7. The carrier control loop as claimed in claim 1, wherein the feedback device comprises at least one multiplier (27, 28, 29), and that a coefficient is applied to the multiplier as a multiplication factor.

8. The carrier control loop as claimed in claim 1, wherein the resolver, which is fed by the in-phase component (I) and the quadrature component (Q), uses a modified CORDIC technique in which the phase value ($\phi$) in the first, second, third, or fourth quadrant is mirrored into the first quadrant, forming a mirrored phase value ($\phi$m) as follows:

for the range $\phi$=0 to $\pi$/2:$\phi$m=arctan (Q/I)

for the range $\phi$=/2 to $\pi$:$\phi$m=arctan (|I|/Q), for the range $\phi$= to 3$\pi$/2:$\phi$m=arctan (|Q|/|I|), and for the range $\phi$=3$\pi$/2 to 0:$\phi$m=arctan (I/|Q|).

9. The carrier control loop as claimed in claim 8, wherein the phase deviation value ($\phi$d) is formed by subtracting a modulation-dependent phase correction value ($\phi$c) from the mirrored phase value ($\phi$m).

10. The carrier control loop as claimed in claim 1, wherein the detector forms the frequency deviation value (fd) from the phase deviation values ($\phi$d) or phase values ($\phi$) by modulo subtraction.

11. The carrier control loop as claimed in claim 1, wherein the feedback device comprises at least one MTA filter whose control clock is enabled at a sufficient reliability value (z) and inhibited at an insufficient reliability value (z).

12. A receiver for receiving a digitally transmitted signal, said receiver comprising a carrier control loop comprising:

a quadrature demodulator for demodulating said digitally transmitted signal;

a symbol recognition device coupled to said quadrature demodulator;

a detector coupled to said symbol recognition device, said detector for forming phase ($\phi$d) and frequency deviation (fd) values;

an evaluating device coupled to said symbol recognition device, said evaluating device for determining a reliability value (z) for said respective phase deviation value ($\phi$d) and frequency deviation value (fd);

a feedback device coupled to said detector and said evaluating device for generating a control signal dependent upon said phase deviation ($\phi$d) and frequency deviation (fd) values having suitable reliability values (z); and, a variable-frequency oscillator coupled to said feedback device and said quadrature demodulator, said variable-frequency oscillator being responsive to said control signal;

wherein said quadrature demodulator is responsive to said variable frequency oscillator.

13. The receiver of claim 12, wherein the evaluating device evaluates a phase value ($\phi$) and an absolute value (b) which are formed by means of a resolver from an in-phase component (I) and a quadrature component (Q) produced by the quadrature demodulator.

14. The receiver of claim 13, wherein the evaluating device comprises a first threshold detector for the phase value ($\phi$) or the phase deviation value ($\phi$d) and a second threshold detector for the absolute value (b) or an absolute deviation value.

15. The receiver of claim 14, wherein a first blocking device is controlled in accordance with the output of the first threshold detector, and a second blocking device is controlled in accordance with the output of the second threshold detector.

16. The receiver of claim 15, wherein by means of the first blocking device, the transfer of the phase deviation value ($\phi$d) into the feedback device is blocked, and that by means of the second blocking device, the transfer of the frequency deviation value ($\phi$d) into the feedback device is blocked.

17. The receiver of claim 12, wherein the feedback device corresponds to a PID controller, with the phase deviation value ($\phi$d) being fed to a proportional section (B) and an integral section (Ir), and the frequency deviation value (fd) to a derivative section (D).

18. The receiver of claim 12, wherein the feedback device comprises at least one multiplier, and that a coefficient is applied to the multiplier as a multiplication factor.

19. The receiver of claim 13, wherein the resolver, which is fed by the in-phase component (I) and the quadrature component (Q), uses a modified CORDIC technique in which the phase value ($\phi$) in the first, second, third, or fourth quadrant is mirrored into the first quadrant, forming a mirrored phase value ($\phi$m) as follows:

for the range $\phi$=0 to $\pi$/2:$\phi$m=arctan (Q/I)

for the range $\phi$=$\pi$/2 to $\pi$:$\phi$m=arctan (|I|/Q), for the range $\phi$=$\pi$ to 3$\pi$/2:$\phi$m=arctan (|Q|/|I|), and for the range $\phi$=3$\pi$/2 to 0:$\phi$m=arctan (I/|Q|).

20. A method for receiving a digitally transmitted signal comprising the steps of:

demodulating said digital signal into a plurality of components;

forming phase deviation and frequency deviation values utilizing said plurality of components;

determining the reliability of said phase and frequency deviation values; and, generating a control signal based upon said phase and frequency deviation values having a suitable reliability;

wherein, said demodulating of said digital signal is responsive to said control signal.

* * * * *